United States Patent

Konno

Patent Number: 5,678,392
Date of Patent: Oct. 21, 1997

[54] RESIDUAL PRODUCT REMOVING APPARATUS

[75] Inventor: Hidetoshi Konno, Kanagawa, Japan

[73] Assignee: Tetra Laval Holdings & Finance S.A., Switzerland

[21] Appl. No.: 564,195

[22] PCT Filed: Jul. 8, 1994

[86] PCT No.: PCT/JP94/01125

§ 371 Date: Dec. 7, 1995

§ 102(e) Date: Dec. 7, 1995

[87] PCT Pub. No.: WO95/01910

PCT Pub. Date: Jan. 19, 1995

[30] Foreign Application Priority Data

Jul. 9, 1993 [JP] Japan ................ 5/169957

[51] Int. Cl.$^6$ ................................ B65B 51/10
[52] U.S. Cl. ............... 53/477; 53/373.7; 53/374.2; 53/375.9; 53/451; 53/551
[58] Field of Search .................. 53/373.7, 373.8, 53/374.2, 374.3, 375.9, 376.2, 550, 551, 477, 451

[56] References Cited

U.S. PATENT DOCUMENTS

| | | | |
|---|---|---|---|
| 4,534,818 | 8/1985 | Kreager et al. | 53/576 |
| 4,630,429 | 12/1986 | Christine | 53/551 |
| 4,757,668 | 7/1988 | Klinkel et al. | 53/375.9 |
| 5,207,049 | 5/1993 | Baruffato et al. | 53/374.2 |
| 5,403,427 | 4/1995 | Wilcox | 53/373.7 |

FOREIGN PATENT DOCUMENTS

| | | | |
|---|---|---|---|
| 3148426 | 6/1991 | Japan | 53/374.2 |
| 4142231 | 5/1992 | Japan | 53/374.2 |
| 676958 | 3/1991 | Switzerland | 53/373.8 |

*Primary Examiner*—John Sipos
*Assistant Examiner*—Gene L. Kim
*Attorney, Agent, or Firm*—Lorusso & Loud

[57] ABSTRACT

A residual product removing apparatus which can prevent a liquid food (12) from flowing out even when a seal portion (S) is cut at its center. A pair of cutting rails (31, 32) are disposed in a cutting jaw (15a), and a cutter (21) is disposed in a clearance (33) formed between the cutting rails (31, 32) to be movable in advancing and retracting directions. A packaging material is cut at opposing portions (11a, 11b) when the cutter (21) is advanced. Dollies (31a, 32a) are disposed along the cutting rails (31, 32). A pair of heating bodies are disposed in a heat sealing jaw (15b) so as to squeeze and seal the opposing portions (11a, 11b) of the packaging material in cooperation with the dollies (31a, 32a). A groove (38) is formed between the heating bodies. The tip of the cutter (21) enters the groove (38) when the cutter (21) is advanced, and the tip of the cutter (21) presses the packaging material when the cutter (21) is located at its retracted position. Accordingly, no product remaining portion is produced between the opposing portions (11a, 11b) of the packaging material.

3 Claims, 7 Drawing Sheets

FIG.1(a) (PRIOR ART)
FIG.1(b) (PRIOR ART)
FIG.1(c) (PRIOR ART)
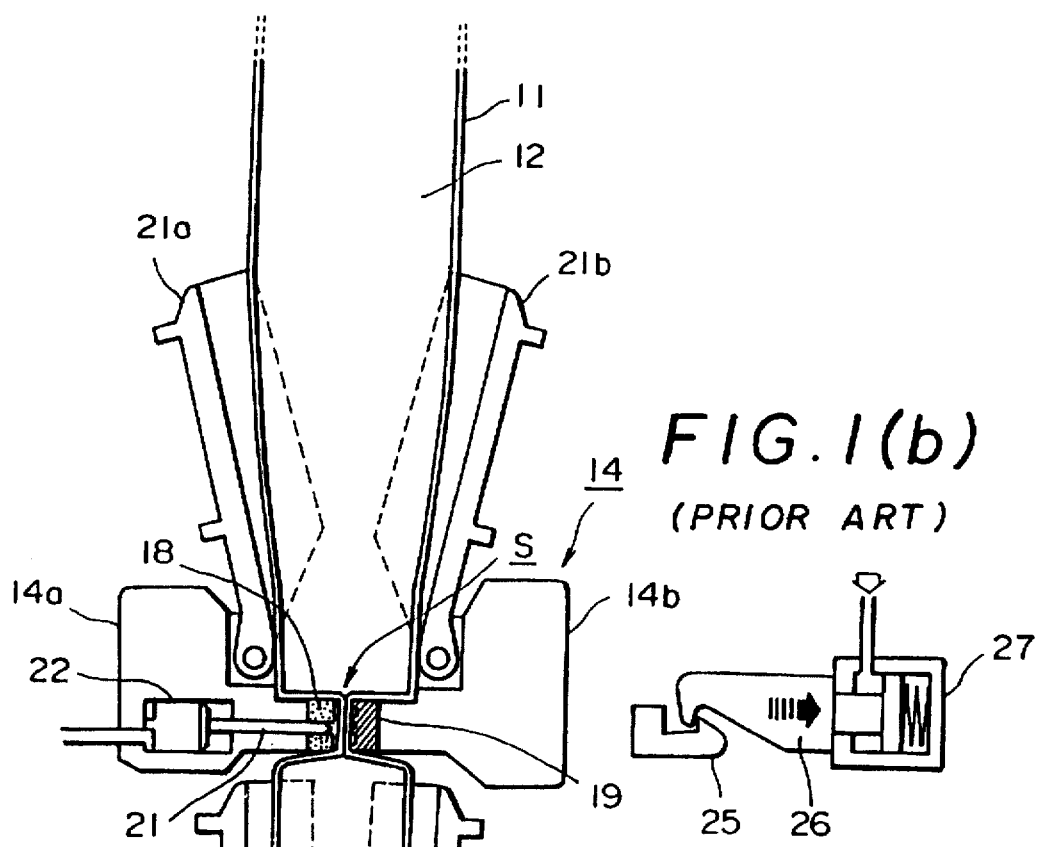
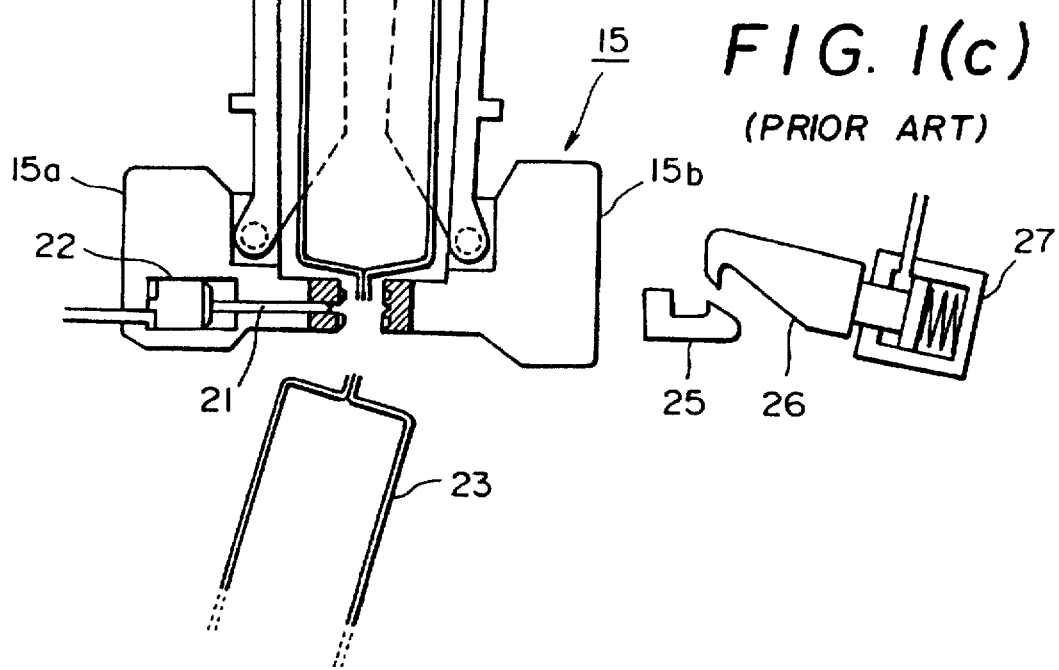

RESIDUAL PRODUCT REMOVING APPARATUS

TECHNICAL FIELD

The present invention relates to a residual product removing apparatus.

BACKGROUND ART

Conventionally, in a process for manufacturing a container for liquid foods such as milk and soft drinks, a web-like packaging material made of a flexible laminated material is supplied to an filling apparatus. In the filling apparatus, the packaging material is formed into a tube, which is filled with a liquid food, and then cut into a brick-shaped container.

In detail, the filling apparatus seals the web-like packaging material in the longitudinal direction to form a tube, and continuously feeds the tube downward. While the tube is fed downward, liquid food is supplied to the tube from its top. Then, the tube is pressed from the both sides thereof by sealing/cutting units so that sealing in the lateral direction is carried out at predetermined intervals.

Subsequently, a laterally sealed portion is cut to form a plurality of rectangular containers each holding a predetermined amount of the liquid food therein, thereby completing the manufacture of containers.

FIG. 1 is a schematic illustration showing a main portion of a conventional filling apparatus. In FIG. 1, section (a) is a schematic illustration showing a forming unit, section (b) is an illustration showing an engaged state of engaging members, and section (c) is an illustration showing a disengaged state of the engaging members.

In this drawing, reference numeral 11 is a tube made of a flexible laminated material and formed by sealing a web-like packaging material in the longitudinal direction. The packaging material is laminated, for example, such that lamination layers thereof will be in the order of a polyethylene layer, an aluminum foil layer, an adhesive layer, a paper material and a polyethylene layer, from inside to outside of a container which will be formed from the packaging material.

The tube 11 is continuously transferred downward, and squeezed and sealed in the lateral direction at predetermined intervals by two sealing/cutting units 14 and 15, thereby forming a strip-shaped seal portion S. While the tube is fed downward, a liquid food 12 is supplied to the tube 11 from its top.

Then, the seal portion S is cut to form a rectangular container 23 filled with a predetermined amount of the liquid food 12. For these operations, both of the sealing/cutting units 14 and 15 have cutting jaws 14a and 15a and heat sealing jaws 14b and 15b.

Moreover, a cutting bar 18 is attached to the forward end of each cutting jaw 14a, 15a while an inductor 19 is attached to the forward end of each heat sealing jaw 14b, 15b. The cutting jaws 14a and 15a and the heat sealing jaws 14b and 15b are advanced to squeeze the tube 11 from both sides thereof for bringing opposing inner faces of the tube 11 in contact with each other and sealing in the lateral direction.

Also, at the center of the cutting jaws 14a and 15a, a flat cutter 21 extending in the lateral direction is disposed to be movable in advancing and retracting directions. The seal portion S is cut at its center when the cutter is advanced. For moving the cutter 21 forward and backward, a cylinder 22 is attached to the backward end of the cutter 21, and an operating fluid is fed to and drained from the cylinder 22 for moving the cutter 21 forward and backward.

Reference numerals 21a and 21b are a pair of forming flaps which are pivotably attached to the cutting jaws 14a and 15a and the heat sealing jaws 14b and 15b for enclosing and guiding the tube 11 and form the tube 11 into a rectangle.

In the drawing, the sealing/cutting unit 14 is in the position of starting the sealing/cutting operation, where the cutting jaw 14a and the heat sealing jaw 14b are advanced to squeeze the tube 11 from both sides thereof for bringing opposing inner faces of the tube 11 in contact with each other.

Then, the sealing/cutting unit 14 moves downward while holding the tube 11 squeezed. While the sealing/cutting unit 14 is moving downward, the inductor 19 disposed at the forward end of the heat sealing jaw 14b, and the cutting bar 18 disposed at the forward end of the cutting jaw 14a strongly press the seal portion S, and the inductor 19 causes the aluminum foil layer of the packaging material to generate heat by induction heating to laterally seal the tube 11 for forming the seal portion S. In this case, the inductor 19 is used to seal the tube 11 by induction heating. However, a resistance element may be used to seal the tube 11 by generating Joule heat.

Meanwhile, in the figure, the sealing/cutting unit 15 is in the position where the sealing/cutting operation is completed. Immediately before the sealing/cutting unit 15 reaches this position, the cutter 21 of the sealing/cutting unit 15 is advanced so that the seal portion S is cut at its center for separating the rectangular container 23 from the tube 11.

When the seal portion S has been cut at its center, the cutting jaw 15a and heat sealing jaw 15b of the sealing/cutting unit 15 is retracted and then upward to the position of starting the sealing/cutting operation. When the sealing/cutting unit 15 reaches the position of starting the sealing/cutting operation and begins to move the cutting jaw 15a and the heat sealing jaw 15b, the cutter 21 of the sealing/cutting unit 14 is advanced to cut the seal portion S at its center for separating the rectangular container 23 from the tube 11.

Reference numerals 25 and 26 are a pair of engaging hooks which form engaging members. An engaging hook 25 is attached to each cutting jaw 14a, 15a, while another engaging hook 26 is attached to each heat sealing jaws 14b, 15b. A cylinder 27 is connected to each engaging hook 26.

Then, after the engaging hooks 25 and 26 are engaged with each other, by supplying an operating medium to the cylinders 27, the cutting jaws 14a and 15a and the heat sealing jaws 14b and 15b are drawn toward each other, thereby increasing a pressing force in sealing. In the position of starting the sealing/cutting operation, the engaging hooks 25 and 26 are engaged with each other as shown in section (b) of FIG. 1 while in the position of finishing the sealing/cutting operation, the hooks are disengaged from each other as shown in section (c) of FIG. 1.

Next, the sealing/cutting unit 15 will be described in detail.

FIG. 2 is a sectional view of a main portion of a sealing/cutting unit of a conventional filling apparatus.

In this drawing, reference numeral 11 is a tube, and reference numerals 11a and 11b are opposing portions of the packaging material constituting the tube 11. Reference numeral 15 is a sealing/cutting unit, reference numeral 15a is a cutting jaw, reference numeral 15b is a heat sealing jaw, reference numeral 19 is an inductor, and reference 21 is a cutter.

The cutting jaw 15a has a pair of cutting rails 31 and 32. The cutter 21 is disposed in a clearance 33 formed between the cutting rails 31 and 32, and is advanced and retracted in the direction of arrow A by a cylinder 22 (FIG. 1).

The cutting rails 31 and 32 have dollies 31a and 32a, respectively, extending along the cutting rails 31 and 32. The seal portion S of the tube 11 is strongly pressed by the dollies 31a and 32a. Hence, the dollies 31a and 32a are made flat at their surfaces opposed to the heat sealing jaw 15b. The seal portion S comprises first and second seal portions $S_1$ and $S_2$ corresponding to the dollies 31a and 32a, respectively.

Meanwhile, the inductor 19 has the first and second induction heating bodies 35 and 36 disposed opposite the dollies 31a and 32a. The first and second induction heating bodies 35 and 36 extend along the dollies 31a and 32a and have projections 35a and 36a projecting toward the cutting jaw 15a.

Also, a groove 38 is formed between the first and second induction heating bodies 35 and 36 to accommodate the tip of the cutter 21 when the cutter 21 is advanced. The groove 38 extends along the first and second induction heating bodies 35 and 36. Incidentally, reference numeral 40 is a product remaining portion, and reference numeral 41 is a clearance.

However, in the conventional filling apparatus, when the cutting jaws 15a and the heat sealing jaw 15b are advanced to squeeze the tube 11 from both sides thereof for bringing opposing portions 11a and 11b of the tube 11 in contact with each other and sealing in the lateral direction, the product remaining portion 40 in which the product, i.e., a liquid food 12 remains is formed along the seal portion S.

In detail, when the cutting jaw 15a and the heat sealing jaw 15b are advanced to squeeze the tube 11 from both sides thereof, the opposing portions 11a and 11b of the tube 11 are brought in contact with each other at the first and second seal portions $S_1$ and $S_2$. At this time, since the clearance 41 is formed between the dollies 31a and 32a, the opposing portion 11a warps toward the cutting jaw 15a across the width of the clearance 41. Also, since the groove 38 is formed in the heat sealing jaw 15b, the opposing portion 11b warps toward the heat sealing jaw 15b across the width of the groove 38.

Accordingly, the product remaining portion 40 is formed, and the liquid food 12 remains in the product remaining portion 40.

Then, when the cutter 21 is advanced to cut the seal portion S at the center thereof, i.e. between the first and second seal portions $S_1$ and $S_2$, the liquid food 12 remaining in the product remaining portion 40 flows out. Moreover, if the liquid food 12 remains adhering to a cut end surface of the opposing portions 11a and 11b, mold, yeast, bacteria and the like proliferate, causing insanitation.

An object of the present invention is to solve the problem involved in the conventional filling apparatus, and to provide a residual product removing apparatus which can prevent or suppress the forming of a product remaining portion at the center of a sealed portion.

DISCLOSURE OF THE INVENTION

To achieve the above object, the present invention provides a residual product removing apparatus in a sealing/cutting unit which comprises a cutting jaw and a heat sealing jaw which are disposed to face each other and to be movable in advancing and retracting directions for sealing and cutting opposing portions of a packaging material. The residual product removing apparatus includes a pair of cutting rails disposed in the cutting jaw, a cutter which is disposed in a clearance formed between the cutting rails to be movable in advancing and retracting directions and which cuts the packaging material at the opposing portions when advanced, dollies disposed along respective cutting rails, and a pair of heating bodies which are disposed in the heat sealing jaw for squeezing and sealing the opposing portions of the packaging material in cooperation with the dollies, and which form a groove therebetween to accommodate the tip of the cutter when the cutter is advanced.

When the cutting jaw and the heat sealing jaw are mutually advanced to squeeze the opposing portions of the packaging material from both sides thereof, the opposing portions of the packaging material are brought in contact with each other at a seal portion thereof. In this state, when the heating bodies are activated to generate heat, portions of the sealant layer of the packaging material which face each other are fused for sealing.

Then, when the cutter is advanced to let the tip thereof enter the groove, the opposing portions of the packaging material are cut.

In the advanced position of the cutter, the tip of the cutter enters the groove, and in the retracted position, the tip presses the packaging material. Hence, a product remaining portion is not formed between the opposing portions of the packaging material. As a result, even when the cutter is advanced to cut the sealed portion at its center, no liquid food flows out, thereby establishing sanitation.

In another residual product removing apparatus according to the present invention, the heat sealing jaw has a protuberance projecting toward the cutting jaw and formed along the peripheral edge of the groove formed between the heating bodies.

In this case, when the cutting jaw and the heat sealing jaw are mutually advanced to squeeze the packaging material from both sides thereof, the tip of the cutter and the protuberance press the opposing portions of the packaging material. Accordingly, the product remaining portion formed between the opposing portions of the packaging material can be made quite small.

In still another residual product removing apparatus according to the present invention, there are provided a pair of cutting rails disposed in the cutting jaw, a cutter which is disposed in a clearance formed between the cutting rails to be movable in advancing and retracting directions and to cut the packaging material at the opposing portions when advanced, dollies disposed along respective cutting rails, and a pair of heating bodies which are disposed in the heat sealing jaw for squeezing and sealing the opposing portions of the packaging material in cooperation with the dollies, and which form a groove therebetween to accommodate the tip of the cutter when the cutter is advanced.

Also, the cutting jaw has pressing portions projecting toward the heat sealing jaw and formed along peripheral edges of the clearance formed between the cutting rails.

In this case, when the cutting jaw and the heat sealing jaw are mutually advanced to squeeze the opposing portions of the packaging material from both sides thereof, the pressing portions press the packaging material. Accordingly, the product remaining portion formed between the opposing portions of the packaging material can be made quite small.

In yet another residual product removing apparatus according to the present invention, the pressing portions are integrally formed with the cutting rails, respectively.

In this case, when the cutting jaw and the heat sealing jaw are mutually advanced to squeeze the opposing portions of the packaging material from both sides thereof, the cutting rails press the packaging material. Accordingly, the product remaining portion formed between the opposing portions of the packaging material can be made quite small.

In a still further residual product removing apparatus according to the present invention, the pressing portions are integrally formed with the dollies, respectively.

In this case, when the cutting jaw and the heat sealing jaw are mutually advanced to squeeze the opposing portions of the packaging material from both sides thereof, the dollies press the packaging material. Accordingly, the product remaining portion formed between the opposing portions of the packaging material can be made quite small.

BRIEF DESCRIPTION OF DRAWINGS

FIG. 1 is a schematic illustration showing a main portion of a conventional filling apparatus.

BEST MODE FOR CARRYING OUT THE INVENTION

The embodiments of the present invention will next be described in detail with reference to the drawings.

Figure 2:
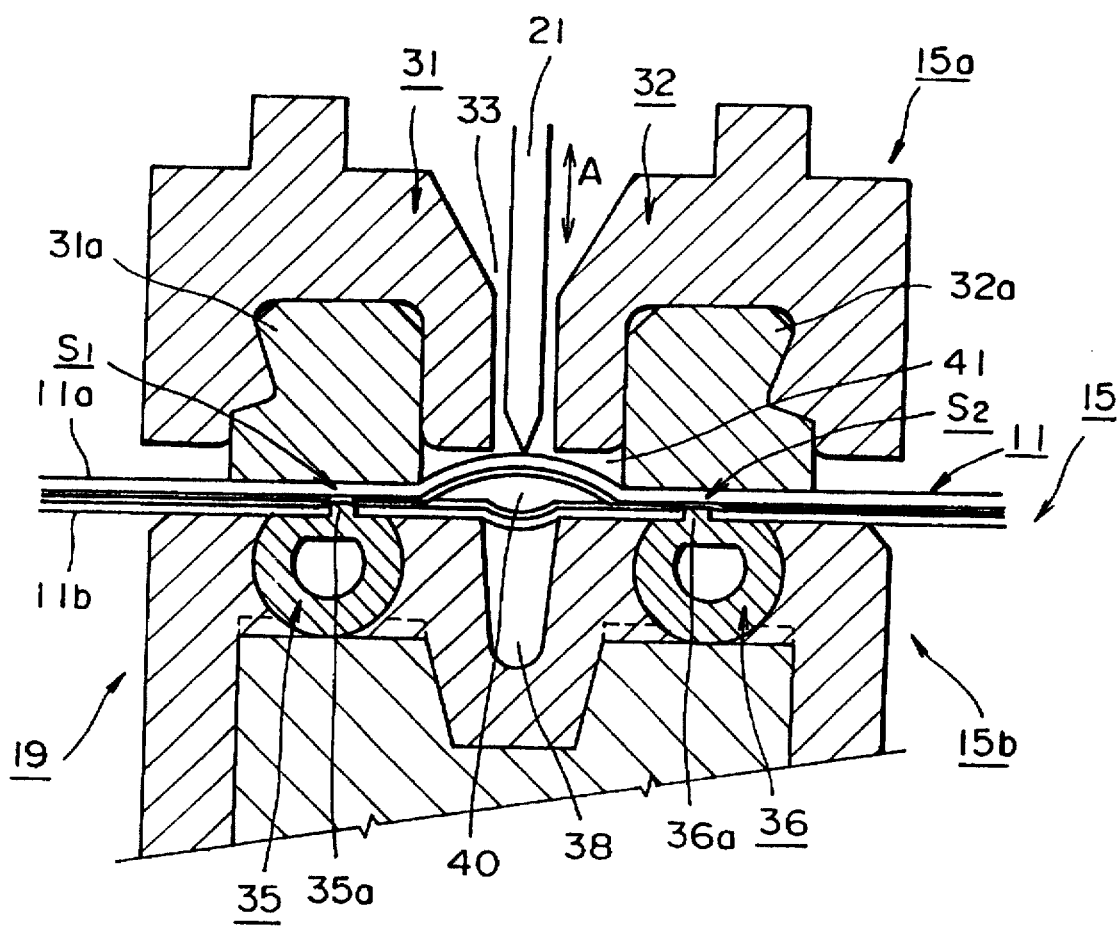
FIG. 2 is a sectional view of a main portion of a sealing/cutting unit of the conventional filling apparatus.
Figure 3:
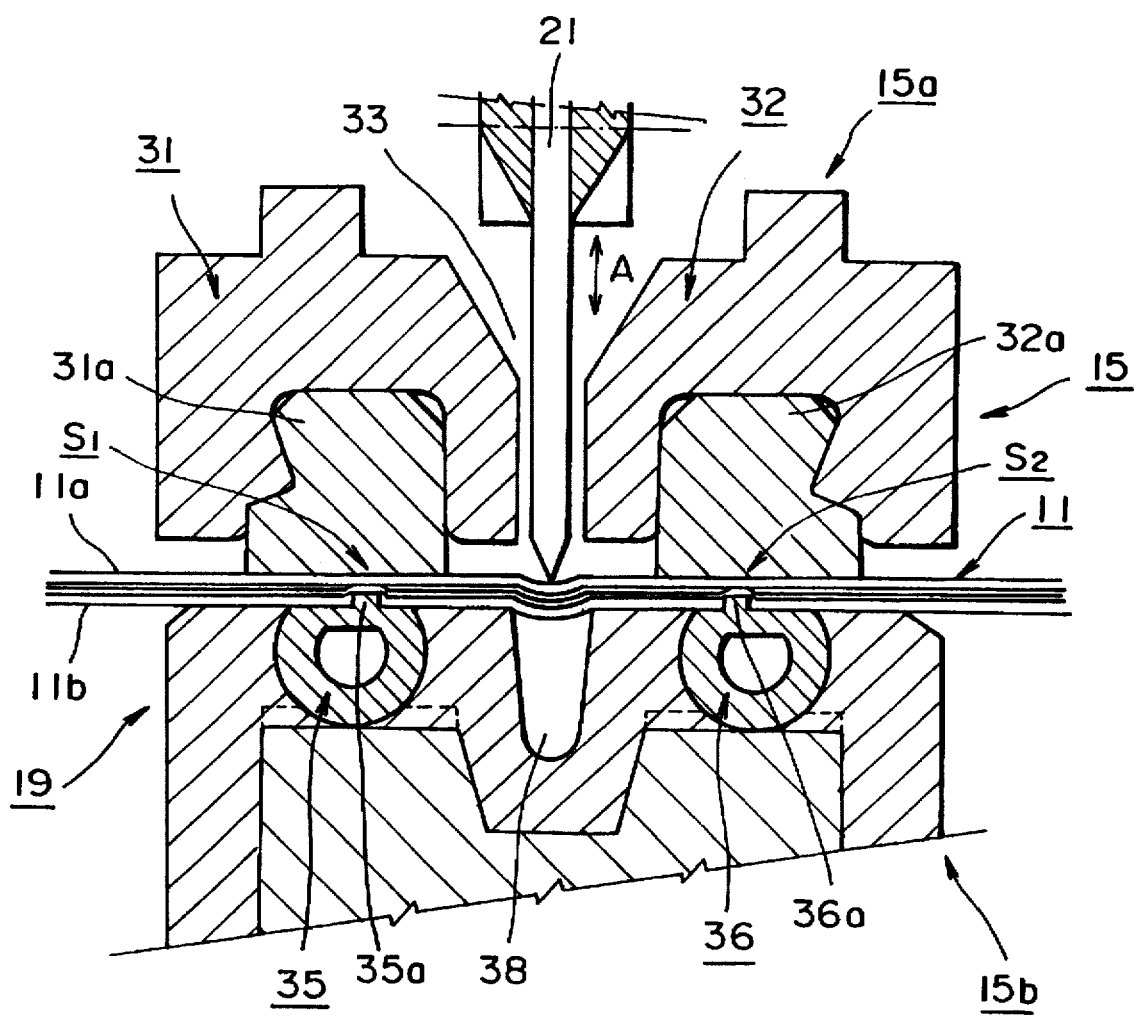
FIG. 3 is a sectional view of a residual product removing apparatus showing a first embodiment of the present invention.

FIG. 3 is a sectional view of a residual product removing apparatus showing a first embodiment of the present invention.

In this drawing, reference numeral 11 is a tube, and reference numerals 11a and 11b are opposing portions of a packaging material constituting the tube 11. Reference numeral 15 is a sealing/cutting unit, reference numeral 15a is a cutting jaw, reference numeral 15b is a heat sealing jaw, reference numeral 19 is an inductor, and reference 21 is a cutter.

The cutting jaw 15a has a pair of cutting rails 31 and 32. The cutter 21 is disposed in a clearance 33 formed between the cutting rails 31 and 32, and is advanced and retracted in the direction of arrow A by a cylinder 22 (see FIG. 1).

The cutting rails 31 and 32 have dollies 31a and 32a, respectively, extending along the cutting rails 31 and 32. The seal portion S of the tube 11 is strongly pressed by the dollies 31a and 32a. Hence, the dollies 31a and 32a are made flat at their surfaces opposed to the heat sealing jaw 15b. The seal portion S comprises first and second seal portions $S_1$ and $S_2$ corresponding to the dollies 31a and 32a, respectively.

Meanwhile, the inductor 19 has the first and second induction heating bodies 35 and 36 disposed opposite the dollies 31a and 32a. The first and second induction heating bodies 35 and 36 extend along the dollies 31a and 32a and have projections 35a and 36a projecting toward the cutting jaw 15a. When a high-frequency current is supplied to the first and second induction heating bodies 35 and 36, an eddy current flows in the aluminum foil layer of the packaging material to generate heat in the aluminum foil layer by an eddy-current loss. Due to this heat, mutually contacting portions of the polyethylene layer of the packaging material, which serves as a sealant layer, is molten for sealing.

Also, a groove 38 is formed between the first and second induction heating bodies 35 and 36 to accommodate the tip of the cutter 21 when the cutter 21 is advanced. The groove 38 extends along the first and second induction heating bodies 35 and 36.

Meanwhile, the cutter 21 is advanced and retracted in the direction of arrow A by the cylinder 22. In the advanced position of the cutter 21, the tip of the cutter 21 enters the groove 38 to cut the opposing portions 11a and 11b. In the retracted position, the tip presses the opposing portion 11a and also slightly warps the opposing portion 11a toward the heat sealing jaw 15b.

When the cutting jaw 15a and the heat sealing jaw 15b are advanced to squeeze the tube 11 from both sides thereof, the opposing portions 11a and 11b are brought in contact with each other at the first and second seal portions $S_1$ and $S_2$. At this time, since the groove 38 is formed in the heat sealing jaw 15b, the opposing portion 11b warps toward the heat sealing jaw 15b across the width of the groove 38. Also, the tip of the cutter 21 presses the opposing portion 11a and also slightly warps the opposing portion 11a toward the heat sealing jaw 15b.

Accordingly, no product remaining portion is formed between the opposing portions 11a and 11b. As a result, even when the cutter 21 is advanced to cut the seal portion S at its center, i.e. between the first and second seal portions $S_1$ and $S_2$, no liquid food 12 flows out, thereby establishing sanitation.

If there is a possibility that the tip of the cutter 21 contacts the aluminum foil layer of the packaging material at the opposing portion 11a when the cutter 21 is located at the retracted position, it is preferred that the cutter 21 be made of ceramic so that an eddy current in the aluminum foil layer will not flow into the cutter 21 when the seal portion S is sealed.

Next, the second embodiment of the present invention will be described.

Figure 4:
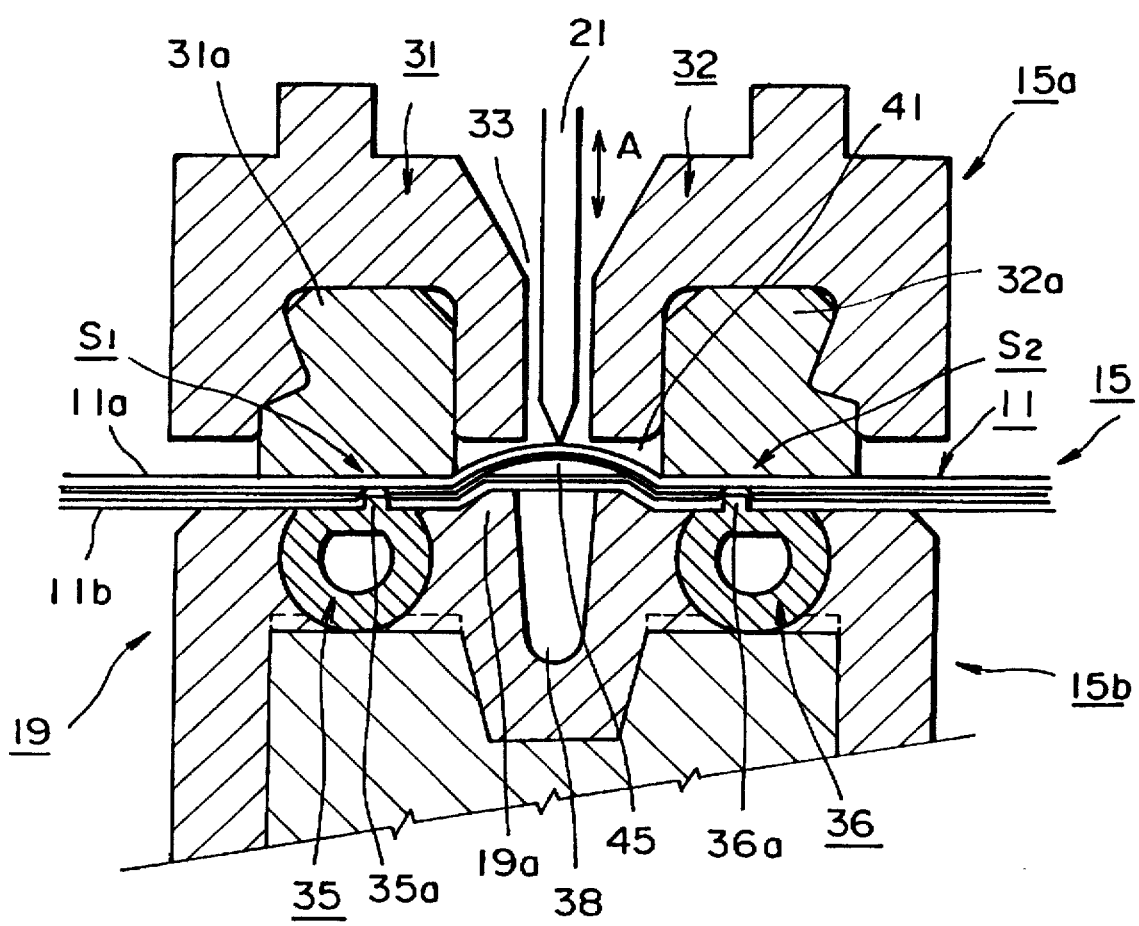
FIG. 4 is a sectional view of a residual product removing apparatus showing a second embodiment of the present invention.

FIG. 4 is a sectional view of a residual product removing apparatus showing the second embodiment of the present invention.

In this drawing, reference numeral 11 is a tube, and reference numerals 11a and 11b are opposing portions of a packaging material constituting the tube 11. Reference numeral 15 is a sealing/cutting unit, reference numeral 15a is a cutting jaw, reference numeral 15b is a heat sealing jaw, reference numeral 19 is an inductor, and reference 21 is a cutter.

The cutting jaw 15a has a pair of cutting rails 31 and 32. The cutter 21 is disposed in a clearance 33 formed between the cutting rails 31 and 32, and is advanced and retracted in the direction of arrow A by a cylinder 22 (see FIG. 1).

The cutting rails 31 and 32 have dollies 31a and 32a, respectively, extending along the cutting rails 31 and 32. The seal portion S of the tube 11 is strongly pressed by the dollies 31a and 32a. Hence, the dollies 31a and 32a are made flat at their surfaces opposed to the heat sealing jaw 15b. The seal portion S comprises first and second seal portions $S_1$ and $S_2$ corresponding to the dollies 31a and 32a, respectively.

Meanwhile, the inductor 19 has the first and second induction heating bodies 35 and 36 disposed opposite the dollies 31a and 32a. The first and second induction heating bodies 35 and 36 extend along the dollies 31a and 32a and have projections 36a and 36a projecting toward the cutting jaw 15a.

Also, a protuberance 19a which slightly projects toward the cutting jaw 15a, is formed between the first and second induction heating bodies 35 and 36. A groove 38 is formed in the protuberance 19a to accommodate the tip of the cutter 21 when the cutter 21 is advanced. The protuberance 19a and the groove 38 extend along the first and second induction heating bodies 35 and 36.

Meanwhile, the cutter 21 is advanced and retracted in the direction of arrow A by the cylinder 22. In the advanced position of the cutter 21, the tip of the cutter 21 enters the groove 38 to cut the opposing portions 11a and 11b. In the retracted position, the tip presses the opposing portion 11a.

In this case, the retracted position of the cutter 21 is set at a position closer to the cutting jaw 15a compared to the retracted position in the first embodiment. Since a clearance 41 is formed between the dollies 31a and 32a, the opposing portion 11a warps toward the cutting jaw 15a across the width of the clearance 41. However, since the opposing portion 11b is deflected toward the cutting jaw 15a by the protuberance 19a, a portion of the packaging material corresponding to the groove 38 does not warp toward the heat sealing jaw 15b side. Accordingly, a production remaining portion 45 formed between the opposing portions 11a and 11b can be made quite small.

If there is a possibility that the tip of the cutter 21 contacts the aluminum foil layer of the packaging material at the opposing portion 11a when the cutter 21 is located at the retracted position, it is preferred that the cutter 21 be made of ceramic so that an eddy current in the aluminum foil layer will not flow into the cutter 21 when the seal portion S is sealed.

Next, the third embodiment of the present invention will be described.

Figure 5:
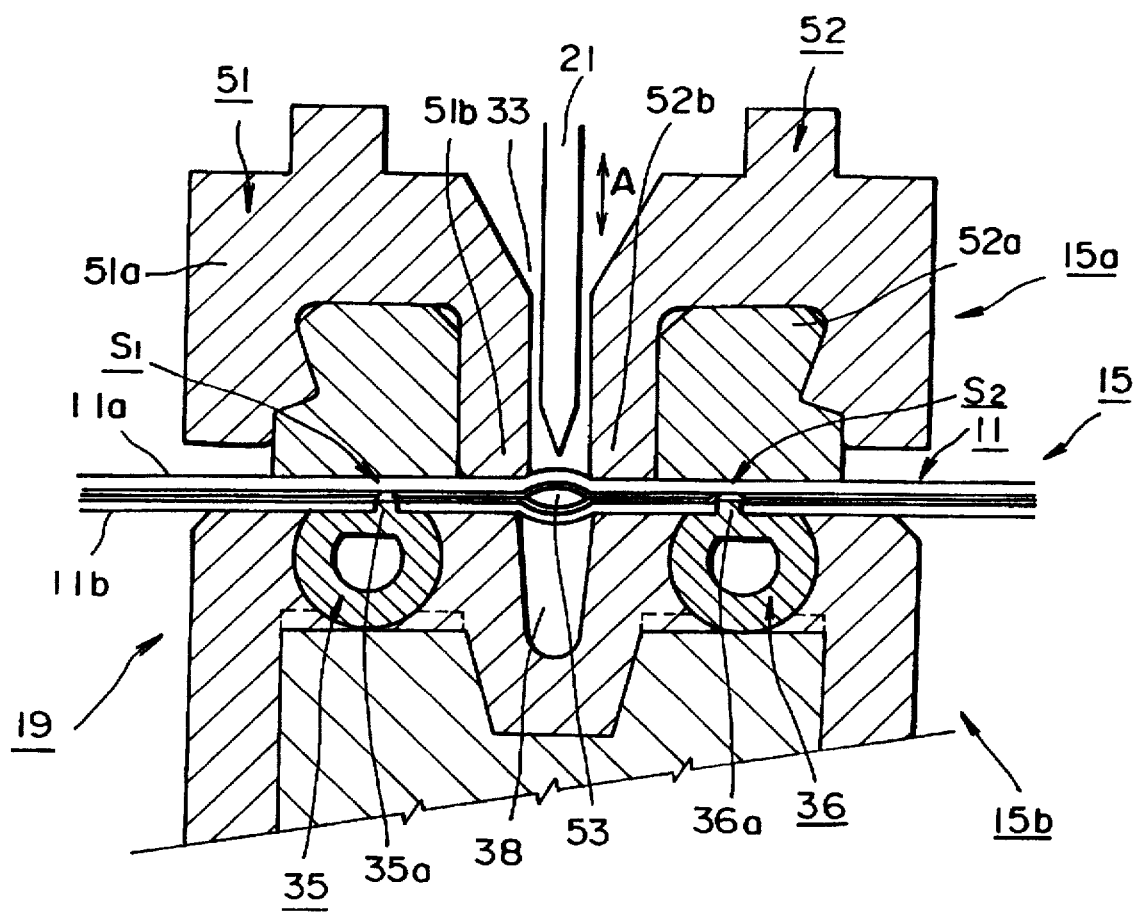
FIG. 5 is a sectional view of a residual product removing apparatus showing a third embodiment of the present invention.

FIG. 5 is a sectional view of a residual product removing apparatus showing the third embodiment of the present invention.

In this drawing, reference numeral 11 is a tube, and reference numerals 11a and 11b are opposing portions of a packaging material constituting the tube 11. Reference numeral 15 is a sealing/cutting unit, reference numeral 15a is a cutting jaw, reference numeral 15b is a heat sealing jaw, reference numeral 19 is an inductor, and reference numeral 21 is a cutter.

The cutting jaw 15a has a pair of cutting rails 51 and 52. The cutter 21 is disposed in a clearance 33 formed between the cutting rails 51 and 52, and is advanced and retracted in the direction of arrow A by a cylinder 22 (see FIG. 1).

The cutting rails 51 and 52 have dollies 51a and 52a, respectively, extending along the cutting rails 51 and 52. The seal portion S of the tube 11 is strongly pressed by the dollies 51a and 52a. Hence, the dollies 51a and 52a are made flat at their surfaces opposed to the heat sealing jaw 15b. The seal portion S comprises first and second seal portions $S_1$ and $S_2$ corresponding to the dollies 51a and 52a, respectively.

Also, the cutting rails 51 and 52 have pressing portions 51b and 52b extending toward the heat sealing jaw 15b between the dollies 51a and 52a. Surfaces of the pressing portions 51b and 52b opposed to the heat sealing jaw 15b are placed substantially on the same plane as the surfaces of the dollies 51a and 52a opposed to the heat sealing jaw 15b.

Meanwhile, the inductor 19 has the first and second induction heating bodies 35 and 36 disposed opposite the dollies 51a and 52a. The first and second induction heating bodies 35 and 36 extend along the dollies 51a and 52a and have projections 35a and 36a projecting toward the cutting jaw 15a.

Also, a groove 38 is formed between the first and second induction heating bodies 35 and 36 to accommodate the tip of the cutter 21 when the cutter 21 is advanced. The groove 38 extends along the first and second induction heating bodies 35 and 36.

Meanwhile, the cutter 21 is advanced and retracted in the direction of arrow A by the cylinder 22. In the advanced position of the cutter 21, the tip of the cutter enters the groove 38 to cut the opposing portions 11a and 11b. In the retracted position, the tip is off the opposing portion 11a.

In this case, in the retracted position of the cutter 21, the tip of the cutter 21 is off the opposing portion 11a, but the surfaces of the pressing portions 51b and 52b opposed to the heat sealing jaw 15b press the seal portion S of the tube 11 together with the dollies 51a and 52a.

Accordingly, since the warping of the opposing portion 11a toward the cutting jaw 15a can be suppressed, a product remaining portion 53 formed between the opposing portions 11a and 11b can be made quite small.

Next, the fourth embodiment of the present invention will be described.

Figure 6:
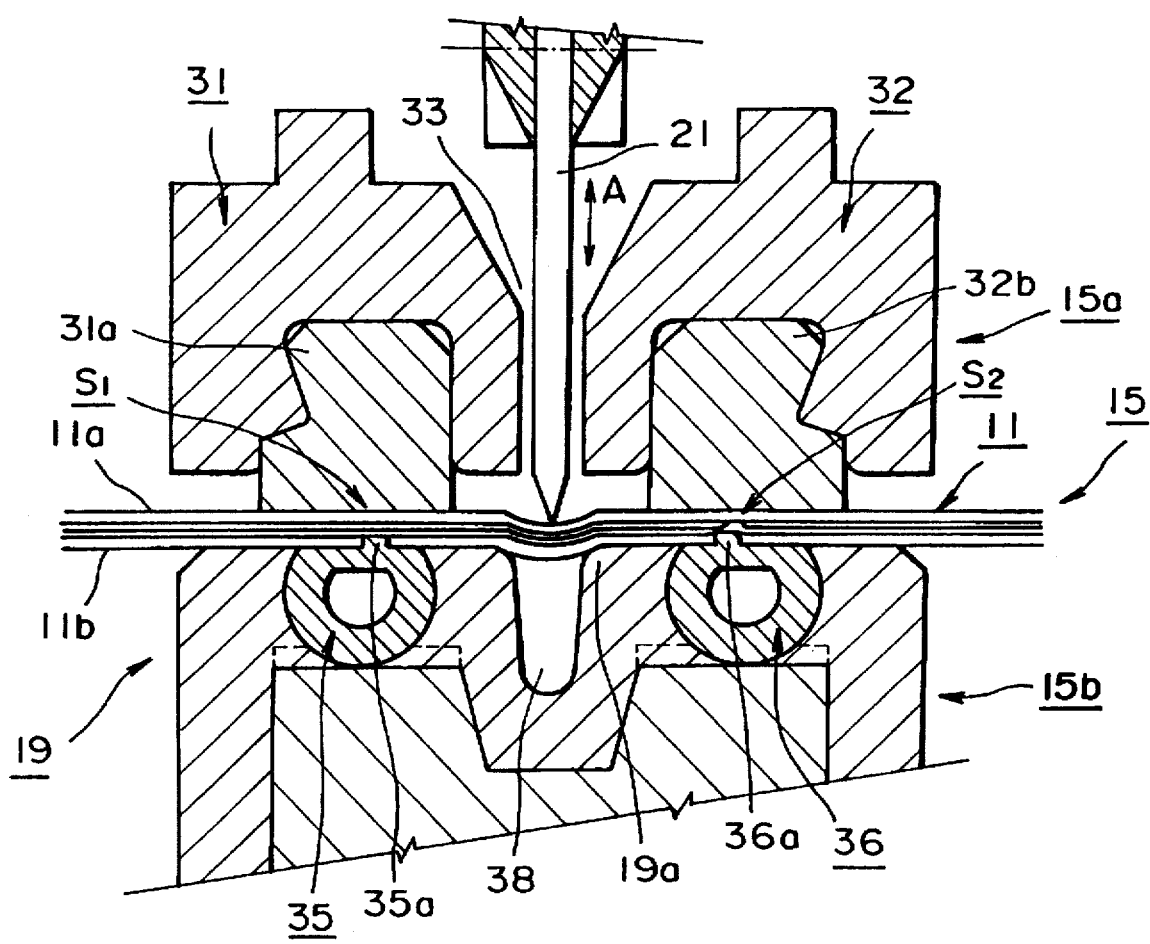
FIG. 6 is a sectional view of a residual product removing apparatus showing a fourth embodiment of the present invention.

FIG. 6 is a sectional view of a residual product removing apparatus showing the fourth embodiment of the present invention.

In this drawing, reference numeral 11 is a tube, and reference numerals 11a and 11b are opposing portions of a packaging material constituting the tube 11. Reference numeral 15 is a sealing/cutting unit, reference numeral 15a is a cutting jaw, reference numeral 15b is a heat sealing jaw, reference numeral 19 is an inductor, and reference numeral 21 is a cutter.

The cutting jaw 15a has a pair of cutting rails 31 and 32. The cutter 21 is disposed in a clearance 33 formed between the cutting rails 31 and 32.

The cutting rails 31 and 32 have dollies 31a and 32a, respectively, extending along the cutting rails 31 and 32. The seal portion S of the tube 11 is strongly pressed by the dollies 31a and 32a.

Meanwhile, the inductor 19 has the first and second induction heating bodies 35 and 36 disposed opposite the dollies 31a and 32a. The first and second induction heating bodies 35 and 36 extend along the dollies 31a and 32a and have projections 35a and 36a projecting toward the cutting jaw 15a.

Also, a groove 38 is formed between the first and second induction heating bodies 35 and 36 to accommodate the tip of the cutter 21 when the cutter 21 is advanced. The groove 38 extends along the first and second induction heating bodies 35 and 36.

Meanwhile, the cutter 21 is advanced and retracted in the direction of arrow A by the cylinder 22. In the advanced position of the cutter 21, the tip of the cutter enters the groove 38 to cut the opposing portions 11a and 11b. In the retracted position, the tip presses the opposing portion 11a and slightly warps the opposing portion 11a toward the heat sealing jaw 15b side.

Accordingly, when the cutting jaw 15a and the heat sealing jaw 15b are advanced to squeeze the tube 11 from both sides thereof, the opposing portions 11a and 11b are brought in contact with each other at the first and second seal portions S₁ and S₂. At this time, since the groove 38 is formed in the heat sealing jaw 15b, the opposing portion 11b warps toward the heat sealing jaw 15b side across the width of the groove 38. Hence, the tip of the cutter 21 presses the opposing portion 11a and slightly warps the opposing portion 11a toward the heat sealing jaw 15b.

As a result, no product remaining portion is formed between the opposing portions 11a and 11b. As a result, even when the cutter 21 is advanced to cut the seal portion S at its center, i.e. between the first and second seal portions S₁ and S₂, no liquid food 12 flows out, thereby establishing sanitation.

In this case, since an edge portion 19a is rounded, a radius of curvature of the warping of the opposing portions 11a and 11b toward the heat sealing jaw 15b becomes large. Hence, when the tip of the cutter 21 presses the opposing portion 11a in the retracted position of the cutter 21, the opposing portion 11a can easily be warped toward the heat sealing jaw 15b.

If there is a possibility that the tip of the cutter 21 contacts the aluminum foil layer of the packaging material at the opposing portion 11a when the cutter 21 is located at the retracted position, it is preferred that the cutter 21 be made of ceramic so that an eddy current in the aluminum foil layer will not flow into the cutter 21 while the seal portion S is sealed.

Next, the fifth embodiment of the present invention will be described.

Figure 7:
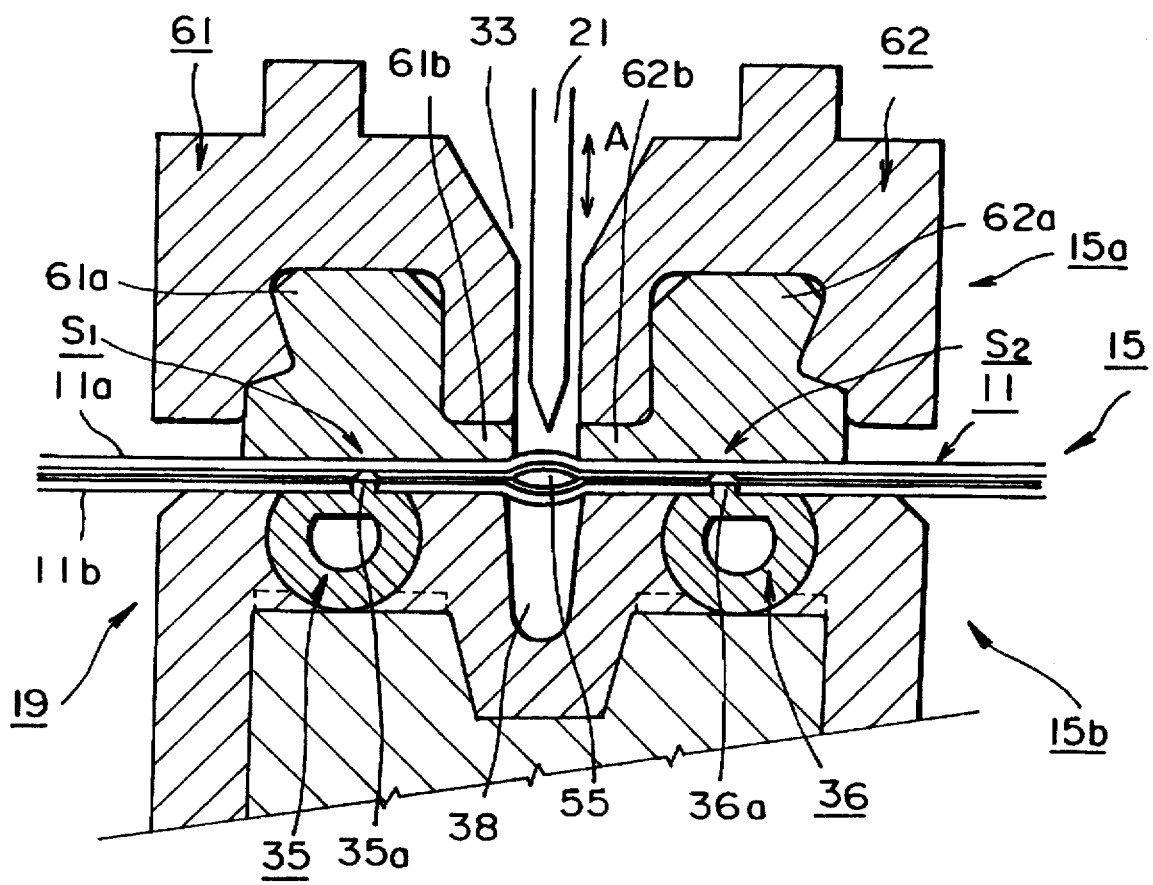
FIG. 7 is a sectional view of a residual product removing apparatus showing a fifth embodiment of the present invention.

FIG. 7 is a sectional view of a residual product removing apparatus showing the fifth embodiment of the present invention.

In this drawing, reference numeral 11 is a tube, and reference numerals 11a and 11b are opposing portions of a packaging material constituting the tube 11. Reference numeral 15 is a sealing/cutting unit, reference numeral 15a is a cutting jaw, reference numeral 15b is a heat sealing jaw, reference numeral 19 is an inductor, and reference numeral 21 is a cutter.

The cutting jaw 15a has a pair of cutting rails 61 and 62. The cutter 21 is disposed in a clearance 33 formed between the cutting rails 61 and 62.

The cutting rails 61 and 62 have dollies 61a and 62a, respectively, extending along the cutting rails 61 and 62. The seal portion S of the tube 11 is strongly pressed by the dollies 61a and 62a.

Also, the dollies 61a and 62a have pressing portions 61b and 62b, respectively, extending toward each other. Surfaces of the pressing portions 61b and 62b opposed to the heat sealing jaw 15b are placed on the same plane as the surfaces of the dollies 61a and 62a opposed to the heat sealing jaw 15b.

Meanwhile, the inductor 19 has the first and second induction heating bodies 35 and 36 disposed opposite the dollies 61a and 62a. The first and second induction heating bodies 35 and 36 extend along the dollies 61a and 62a and have projections 35a and 36a projecting toward the cutting jaw 15a.

Also, a groove 38 is formed between the first and second induction heating bodies 35 and 36 to accommodate the tip of the cutter 21 when the cutter 21 is advanced. The groove 38 extends along the first and second induction heating bodies 35 and 36.

Meanwhile, the cutter 21 is advanced and retracted in the direction of arrow A by the cylinder 22. In the advanced position of the cutter 21, the tip of the cutter enters the groove 38 to cut the opposing portions 11a and 11b. In the retracted positions the tip is off the opposing portion 11a.

In this case, in the retracted position of the cutter 21, the tip of the cutter 21 is off the opposing portion 11a, but the pressing portions 61b and 62b press the seal portion S of the tube 11.

Accordingly, since the warping of the opposing portion 11a toward the cutting jaw 15a can be suppressed, a product remaining portion 55 formed between the opposing portions 11a and 11b can be made quite small.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention is applicable to filling apparatuses which manufacture containers for liquid foods.

I claim:

1. A method of operating a sealing/cutting unit having a cutting jaw and a heat-sealing jaw disposed facing each other, said cutting jaw having a pair of cutting rails defining planar surface areas facing the heat sealing jaw, a cutter which is disposed in a guideway formed between the cutting rails, and said heat sealing jaw having a groove in its planar surface, the groove being aligned with the guideway to receive the tip of the cutter when the cutter is advanced, said method comprising:

(a) positioning a tube of a heat-sealable plastic, filled with a fill material, between said cutting jaw and said heat-sealing jaw;

(b) advancing at least one of said jaws toward the other jaw to squeeze the fill material out of first and second areas of the tube, corresponding to the planar surface areas, on opposing sides of the aligned guideway and groove and to press the tube closed in the first and second areas, the first and second areas being separated by a third area between the aligned groove and guideway;

(c) pressing said cutter against the third area of the tube thereby forcing the fill material out of the third area;

(d) subsequent to steps (a)–(c) heating said first and second areas of said plastic tube to form seals; and (e) subsequent to steps (a)–(d) advancing the cutter, relative to the cutting rails with the tube pressed closed, to an advanced position to sever the tube across said third area; and (f) retracting the cutter to a retracted position.

2. The method of claim 1 wherein said cutter presses against the third area of the tube in said retracted position.

3. The method of claim 1 wherein said heat sealing jaw has a pair of protrusions facing the third area, the protrusions being located on opposite sides of and extending parallel to said groove, the rails of the cutting jaw being spaced to allow the pair of protrusions to fit therebetween when the jaws are pressed together and wherein the third area of the plastic tube is pressed between the cutter and the protrusions and the fill material is forced out of the third area before the plastic tube is pressed closed in the first and second areas.

* * * * *